H. G. VOIGHT.
LOCK.
APPLICATION FILED DEC. 10, 1915.
1,270,468.
Patented June 25, 1918.
6 SHEETS—SHEET 5.
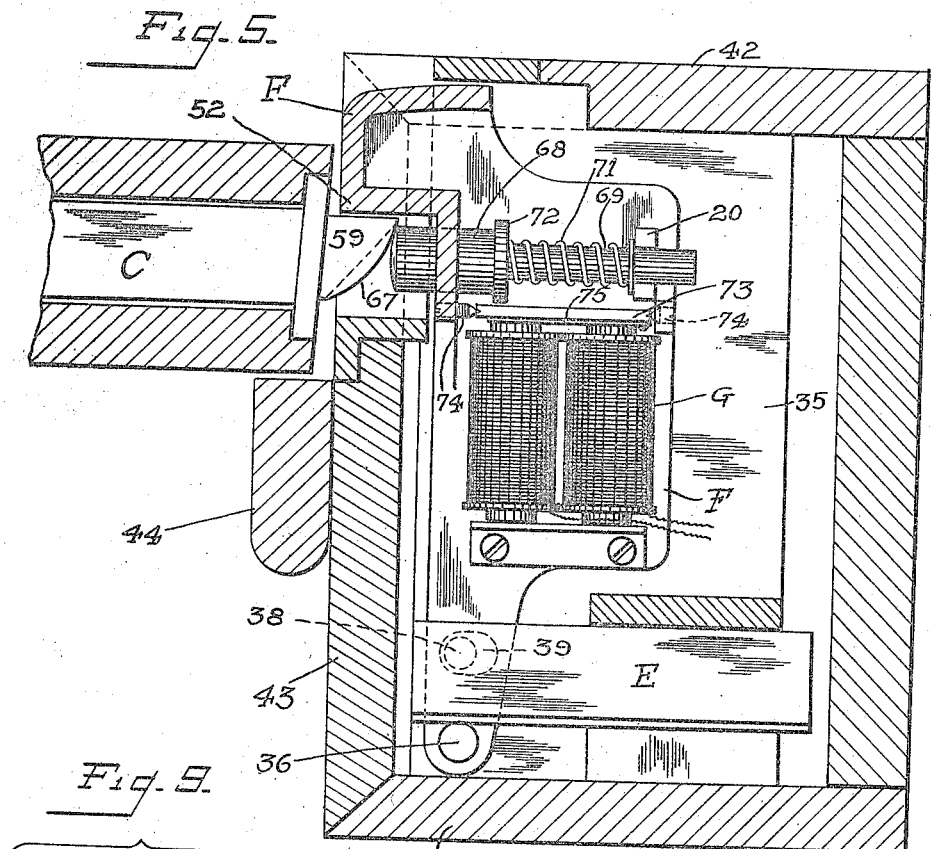
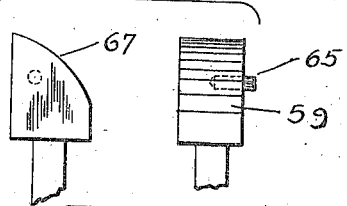
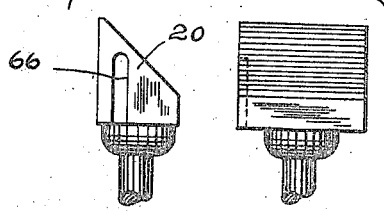
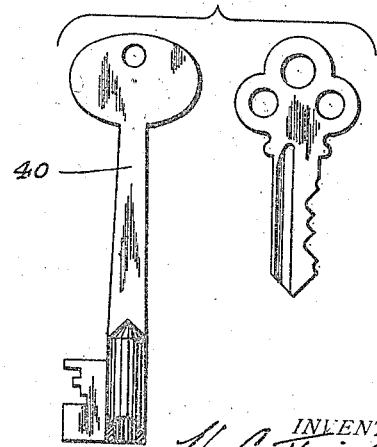
WITNESSES:
INVENTOR.
BY
ATTORNEY.

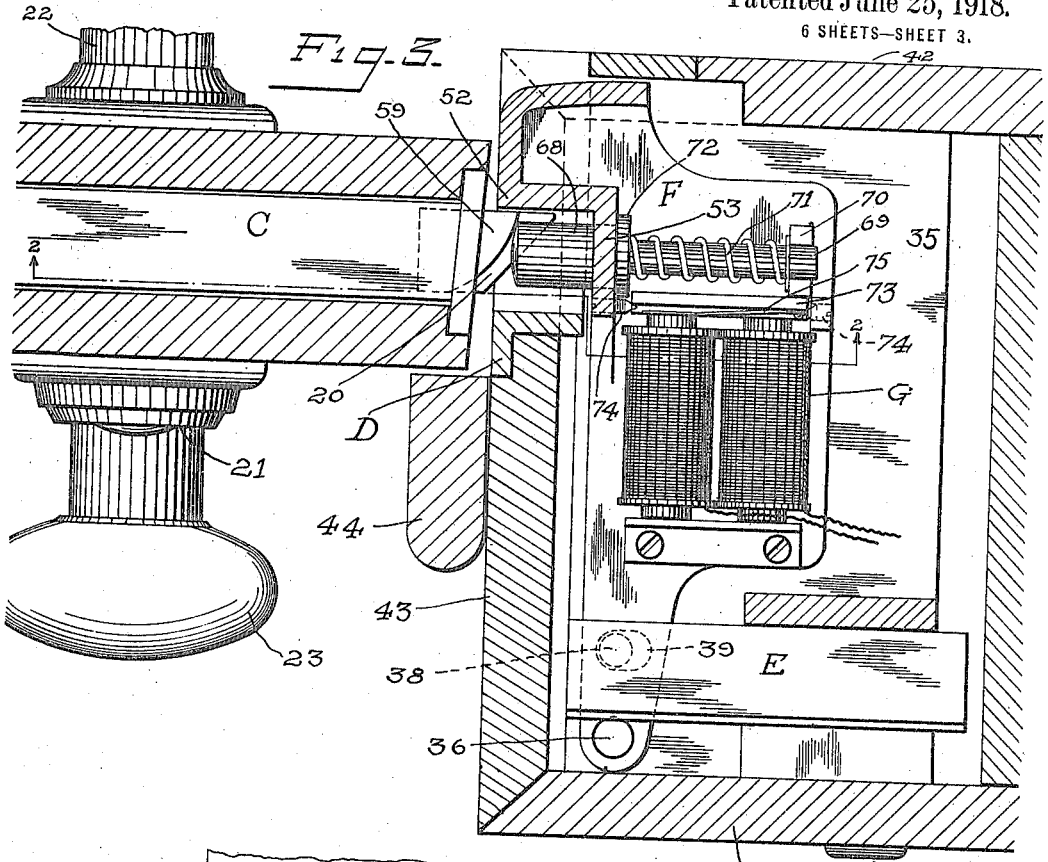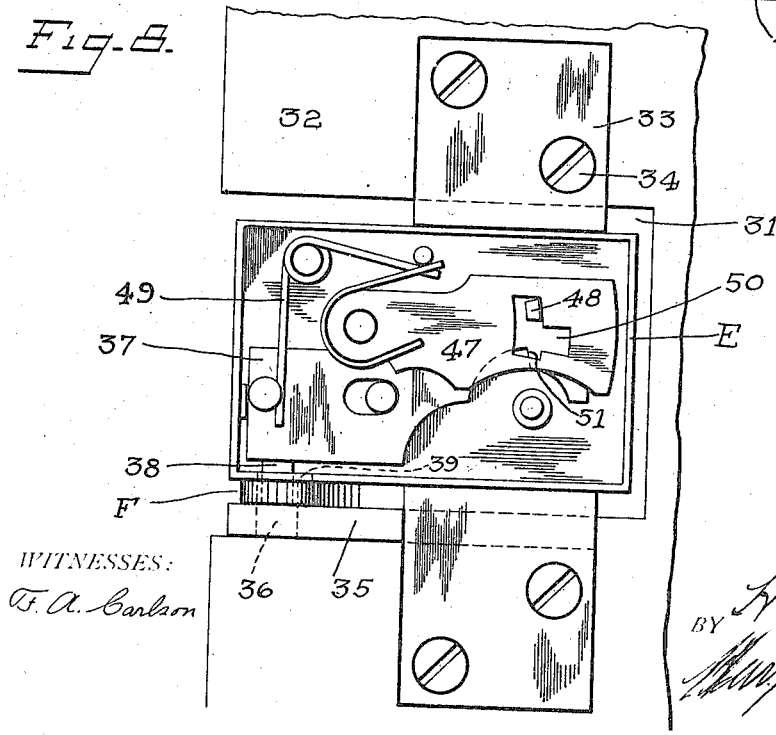

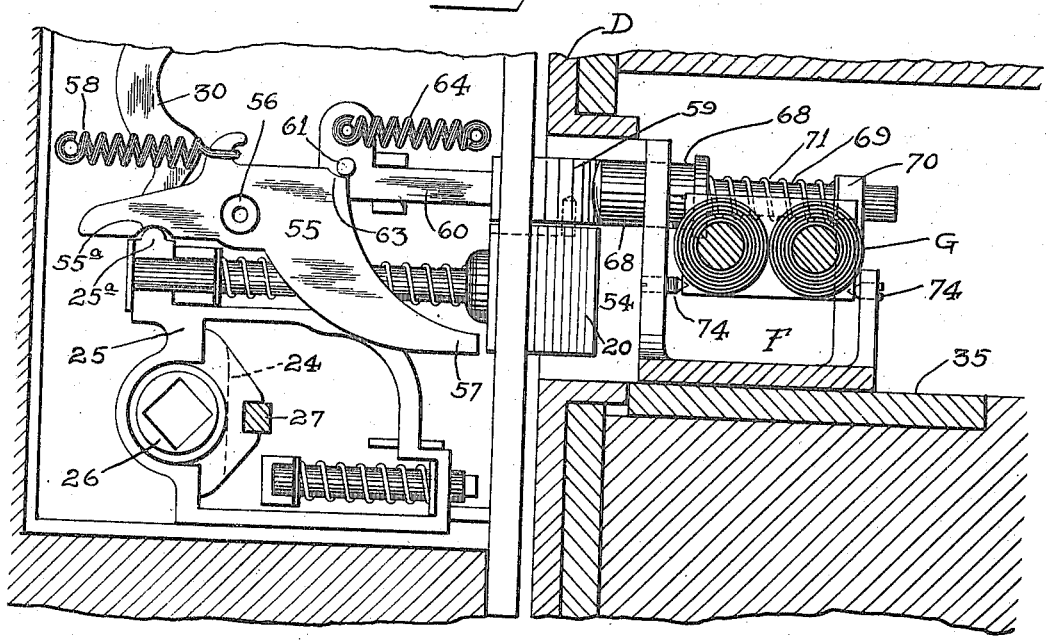
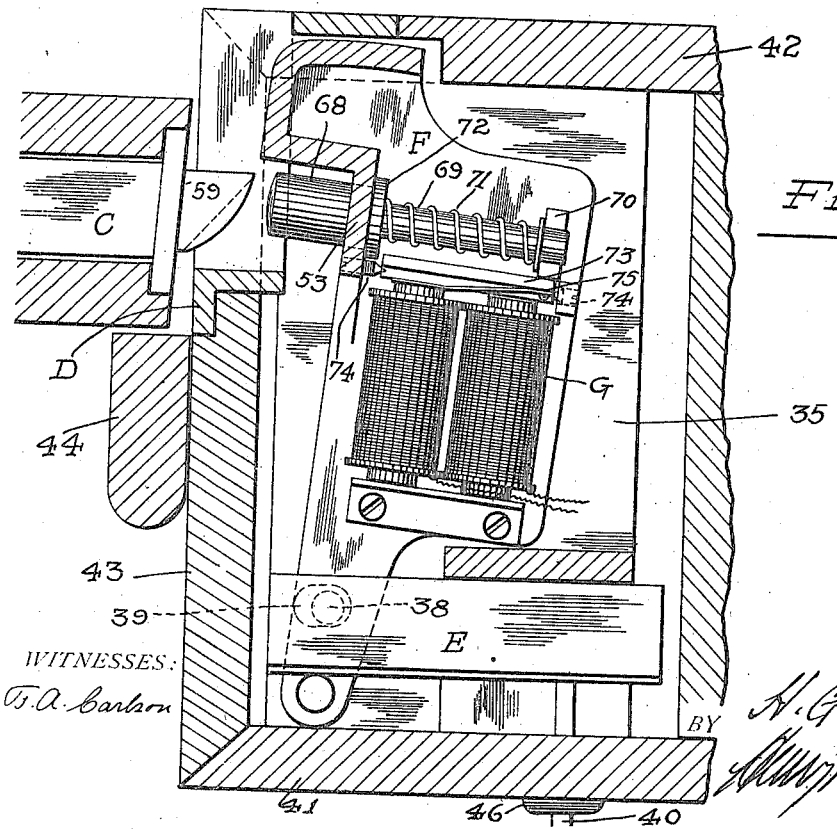

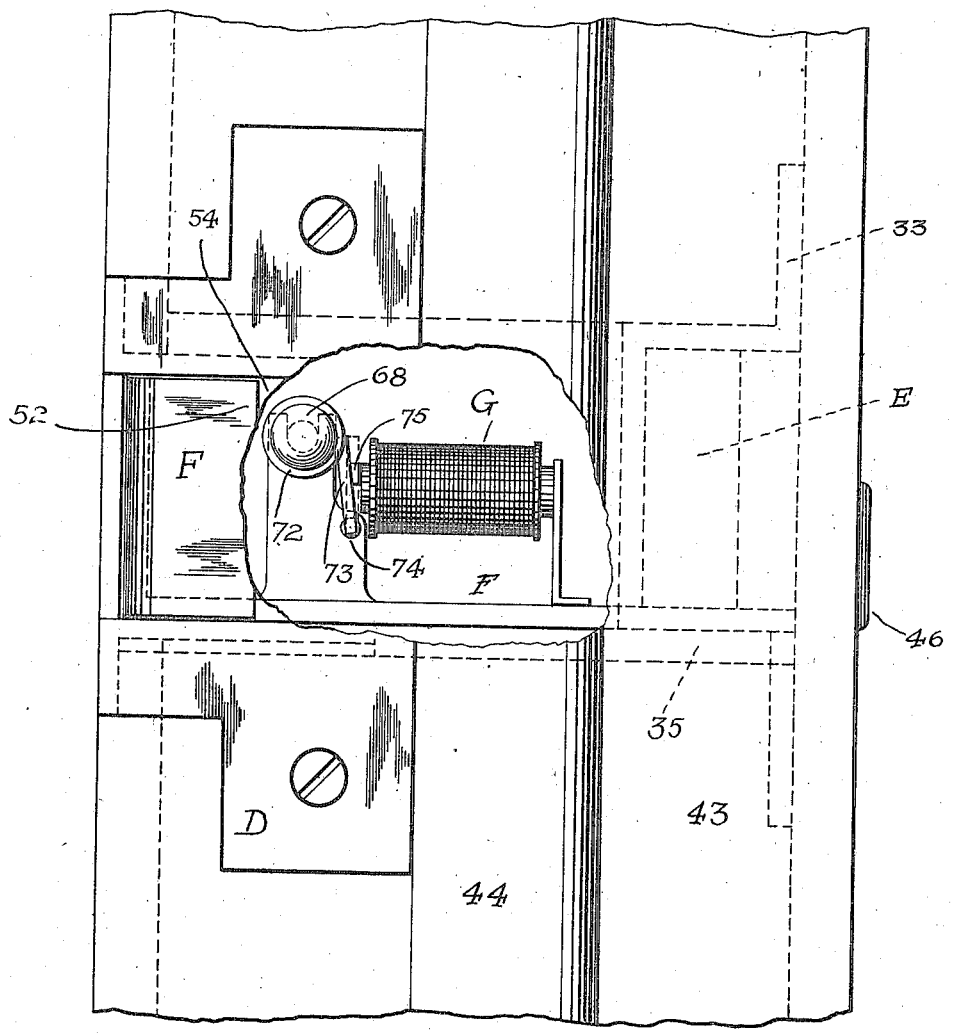

UNITED STATES PATENT OFFICE.

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

LOCK.

1,270,468.  Specification of Letters Patent.  Patented June 25, 1918.

Application filed December 10, 1915. Serial No. 66,104.

*To all whom it may concern:*

Be it known that I, HENRY G. VOIGHT, a citizen of the United States, residing in New Britain, county of Hartford, and State of Connecticut, have invented certain new and useful Improvements in Locks, of which the following is a full, clear and exact description.

This invention relates to locks, and more particularly to corridor locks of hotels, although the invention is applicable to locks of other types. Hotel locks are usually provided with a series of keys, including an emergency key and a display key as well as a change or guest key. When a salesman stopping at a hotel has valuable goods stored in his room and wishes to have them securely locked up during the time that he is away from his room, he usually asks the hotel clerk to have the room door locked by the display key, which acts as a shut-out device for preventing operation of the lock by the maid's key, a duplicate change key, or other keys of low order, although the door can still be opened by the emergency key in the hands of the manager. The display key is then given to the bell-boy, and the salesman often goes back to the room with the bell-boy in order to make sure that the door is locked by the display key. In this way a good deal of trouble is occasioned and considerable time is lost.

One of the primary objects of my present invention is to provide a lock with a shut-out device having a function equivalent to the display key, which shut-out device may be electrically operated from the office of the hotel to lock the door against opening by any key except the emergency key. In order to lock the door of any given room against the change and maid's keys, it is merely necessary to press a button in the office, and therefore the trip of the bell-boy to and from the room with a display key is entirely obviated.

Another object of the invention is to provide an electrical shut-out device which is combined in a novel manner with the mechanism actuated by the emergency key so that the door may be very readily opened by the latter key after the shut-out mechanism has been actuated to lock the door against the other keys.

It is also proposed to furnish an electrically operated shut-out device which, while having the functions stated, will not prevent the room door from being opened from the inside, under all circumstances, because it is obviously important to provide free egress from a hotel room at all times.

To these and other ends, the invention consists in the novel features and combinations of parts to be hereinafter described and claimed.

In the accompanying drawings,

Fig. 3 is a section on line 3—3 of Fig. 1;

Fig. 4 is a fragmentary view similar to Fig. 2, showing the shut-out mechanism actuated to prevent the operation of the change key and the other keys acting on the latch bolt;

Fig. 5 is a horizontal section of the parts shown in Fig. 4;

Fig. 6 is a view similar to Fig. 5, showing the door released by the emergency key;

Fig. 7 is a view of the door casing, with certain parts broken away to show the electromagnet which controls the shut-out plunger;

Fig. 8 is a detail of the lock on the door frame actuated by the emergency key to release the door;

Figure 1:
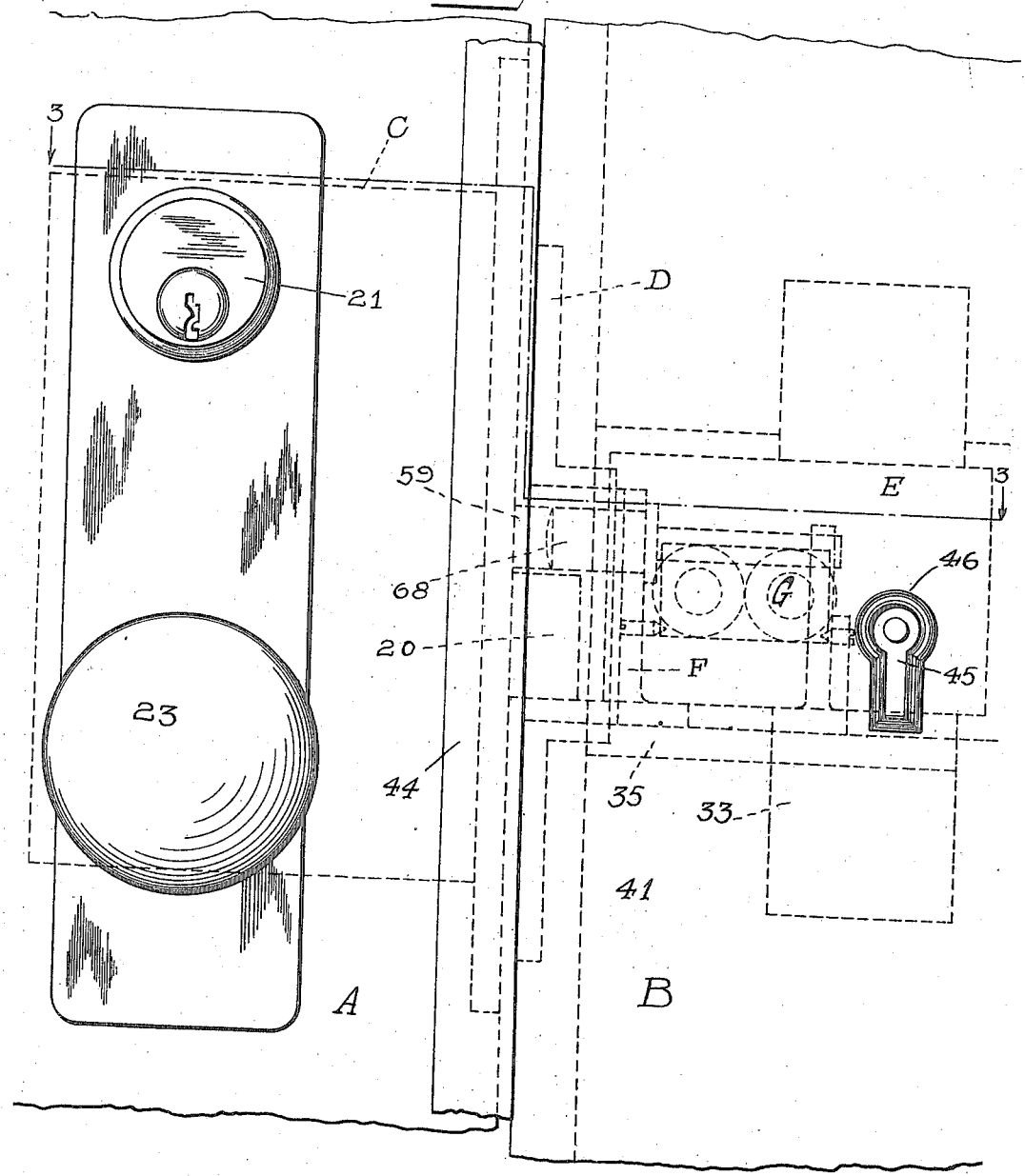
Figure 1 is a fragmentary outside elevation of a door and door casing equipped with my improvements, the door being locked from the outside, but releasable by the change or guest key and the other keys of low order.

Fig. 9 comprises detail views of the controller bolt;

Fig. 10 comprises detail views of the latch bolt; and

Fig. 11 comprises detail views of the guest and the emergency keys.

In the particular embodiment of my invention which I have selected for illustration, the door is provided with a mortise lock of the latch bolt type having a fixed outer knob, and mechanism for retracting the latch bolt from the outside by one or more keys of a suitable pin tumbler mechanism. The casing or frame of the door is provided with a strike plate having a part which may be moved to release the latch bolt by the actuation of an appropriate key called an emergency key that operates an auxiliary or emergency lock associated with the door frame and controlling the movable part of the strike. When the door is locked, the possessor of the emergency key may readily open it by drawing back the movable strike member out of coöperation with the latch bolt so as to gain access to the room in case of emergency or accident; and when the movable part of the strike is again returned to its normal locking position, the lock on the door will act in the usual way. All of the features spoken of above are not essential parts of my invention, but they are mentioned to facilitate an understanding of the following description of the particular construction illustrated.

Referring to the drawings, A denotes the door, B the door frame or casing, C the lock on the door, D the strike on the casing, E the auxiliary or emergency lock associated with the casing, and F the movable part of the strike D adapted to be shifted by said auxiliary or emergency lock. The lock C has a latch bolt 20 adapted to be retracted by a series of keys fitted to a pin tumbler cylinder lock 21 mounted in the usual manner at the outer face of the door. In the particular form shown, the lock C is provided with the usual live inside knob 22 (Fig. 3) for retracting the latch bolt, and the knob 23 at the outside of the door is a fixed or dummy knob, the retraction of the bolt from the outside being confined to the cylinder lock mechanism. The knobs 22, 23 are used in connection with the customary two-part spindle (not shown), the inner section of which engages a hub 24, that is adapted to retract the latch bolt 20 by means of the usual retracting yoke or shoe 25. The other (outer) hub 26 is permanently engaged by a lug 27 on the lock case, which prevents the rotation of the outer knob, although this is not a material feature of the invention. The cylinder lock 21 is provided with the customary roll-back 28 (indicated in dotted lines in Fig. 2) by means of which the latch bolt may be retracted through the retracting lever 29, 30 of well-known form.

Located in a suitable notch 31 in the stud 32 of the door frame is a U-shaped bracket 33 secured to the stud by screws 34. This bracket forms a support or mounting for the auxiliary lock E, which is fitted within the intermediate part of the bracket, as shown more particularly in Fig. 8, and suitably secured to the bracket in such a position as to lie wholly within the notch or other cut-away part in the stud. At its lower part, the bracket rests on a plate 35, which preferably extends completely across the notch in the stud, as shown in Fig. 3, and which serves as a mounting for the movable member F of the strike. Preferably, the member F is of the pivoted type, being pivoted or swiveled to the plate 35 by means of a pivot pin 36 at a point below the auxiliary lock E. The lock E is provided with a bolt 37 which carries a depending pin 38 extending out of the lock case, through a slot 39 in the bottom thereof, and engaging an opening or socket in the movable strike member, the arrangement being such that when the bolt 37 is in the position shown in Fig. 8, the movable strike member F will occupy the position shown in Fig. 3, whereas when the bolt 37 is shifted to the right with respect to Fig. 8, the member F will be swung to the position shown in Fig. 6. In this last position, the movable strike member is shifted out of the path of the latch bolt, so that the door may be freely opened. The bolt 37 of the emergency lock E is actuated by a key 40, termed the emergency key. In the form shown, the auxiliary lock is inclosed by the casing members applied to the stud 32. The outer casing member is shown at 41, the inner casing member at 42, and the intermediate casing member at 43, said last-named casing member being provided with the usual stop bead 44. A keyhole 45 for the auxiliary lock passes through the outer casing member 41, and preferably a small escutcheon 46 will be applied to said casing member around the keyhole. When the emergency key 40 is inserted through the keyhole 45 and turned in the proper direction, it releases a plurality of tumblers 47 from engagement with the stem or fence 48 on the bolt 37 and retracts said bolt, thereby withdrawing the movable part of the strike. The bolt is normally held in its forward position corresponding to the locking position of the strike member F by means of a spring 49. As the bolt is retracted, the stump or fence passes into notches 50 of the tumbler gatings, and immediately upon the release of the key the bolt will spring forward to its initial position, thereby returning the member F to the operative or locking position. The emergency key 40 is preferably of the drill pin type, and the key bit is prevented from making a full rotation in the keyhole by abutting a shoulder 51 on the bolt, so that the key cannot be turned to a position in which the bolt is jammed back in position to release the movable strike member.

Figure 2:
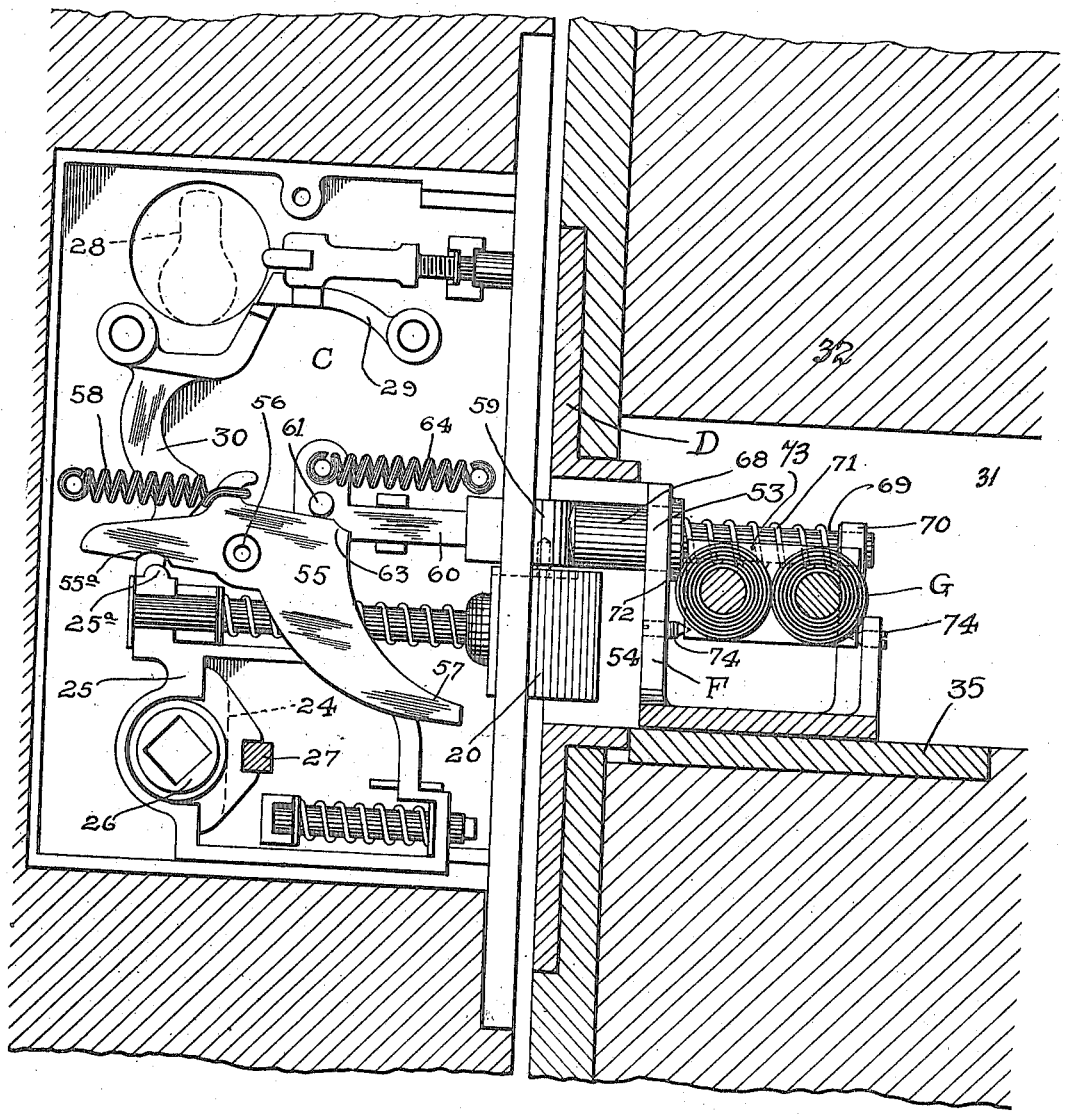
Fig. 2 is a vertical section of the lock mechanism, with the parts in the positions shown in Fig. 1, said section being taken on line 2—2 of Fig. 3.

The strike D is for the most part of customary form, except that it is cut-away at its inner edge to provide a space in which operates a catch portion or lip 52 of the movable member F, and said strike is mortised in the casing member 43 in the customary way. The movable strike member F has a flat base adapted to lie and be guided on the plate 35, and between the lip or catch portion 52, and the pivoted extremity of the member F is a flat upright part 53 adapted to be positioned back of the opening 54 in the fixed part of the strike. The opening 54 which is formed by the fixed and movable members respectively of the strike is adapted to receive the latch bolt 20, as shown in Fig. 2.

Referring now to the electrically controlled shut-out mechanism, the construction may be substantially as follows: A deadlocking or dogging lever 55 is pivoted on a post 56 in the case of lock C, with one end 57 adapted to extend back of the head of the latch bolt 20, so as to dog the latter against retraction. A spring 58 normally holds the lever 55 in dogging position so that the latch bolt cannot be retracted. A controller bolt 59 projects out of the lock front adjacent the latch bolt so as to extend into the opening 54. In the present instance, the controller bolt is located above the latch bolt. Its shank 60 carries a pin 61 adapted to engage a shouldered portion 63 on lever 55 in such a manner that when the controller bolt is pushed back into the case to a certain extent, as hereinafter described, it will shift the dogging lever 55 to release the latch bolt, as shown in Fig. 2. A spring 64 normally protracts the controller bolt 59 to about the same extent as the latch bolt. Suitable provision is made for retracting the controller bolt from the strike opening 54 when the latch bolt is retracted, and in the particular form shown, the controller bolt head carries a pin 65, which engages a groove 66 in the latch bolt head in such a manner as to accomplish this purpose.

It will be understood that by the construction described, the latch bolt normally will be dogged by means of the dogging device 55 when the door is open. The controller bolt 59 enables the latch bolt to be retracted as the door is being closed, so that it may then shoot out again into the opening 54 of the strike to lock the door in the usual manner. It will be understood, of course, that if such a contingency were not provided against, the dogged latch bolt would not pass the movable part F of the strike, but by furnishing the controller bolt 59 with a curved surface 67, which contacts with the strike on the closing of the door before the latch bolt 20 makes contact with the strike, the controller bolt will be pressed in prior to the latch bolt, so that the pin or projection 61 will shift the lever 55 out of dogging position, and thus permit the latch bolt to move back into the case, and then spring outward in the usual manner under the influence of its spring.

In order that the latch bolt may never be dogged against retraction from the inside of the room, suitable provision is made for shifting the dogging device out of its operative position as the inner knob 22 is manipulated. In the embodiment shown, the yoke 25 is provided with a shoulder 25$^a$ coacting with a notched portion 55$^a$ on the lever 55 in such a manner that the forward end of the lever 55 will be moved out of the path of the latch bolt as the yoke is retracted by the inner hub 24 before the bolt head can engage the dogging lever.

As the door is closed, the controller bolt 59 after being pressed back by engagement with the strike is prevented from full protraction by suitable means so that, under normal circumstances, it will hold the dogging lever in the inoperative position, and thus permit free retraction of the latch bolt from the outside of the door by means of the keys adapted to the cylinder lock 21. The means employed for blocking a full excursion of the controller bolt is preferably under electrical control, and so constructed and arranged that on completing an electric circuit by pressing a button located in the hotel office (or otherwise), the controller bolt 59 will be permitted to shoot forward, and thereby cause the dogging of the latch bolt by spring 58 acting on lever 55, so that the keys adapted to the cylinder lock will be inoperative. In the particular form shown, the controller 59 coöperates with a plunger 68 mounted in the movable part F of the strike and controlled by a suitable electromagnet. Preferably, the plunger 68 has a head guided in an opening of the flat upright part 53 opposite the controller. The plunger 68 has a stem 69 guided in a bracket 70 projecting up from the base of the movable member F. The stem 69 is surrounded by a spring 71 which is considerably lighter than the spring 64 acting on the controller bolt. A flange 72 on the rear of the plunger head is adapted to abut against the part 53 of the strike so as to limit the outward movement of the plunger in its opening. An electromagnet G is mounted on the base of member F and connected by suitable wiring with the office of the hotel. This electromagnet has an armature which may take the form of a swinging flap 73. The flap-like armature 73 is swiveled at its lower part by screws 74 so as to swing in a vertical plane toward and away from the poles of the magnet, which are preferably two in number. A spring 75 normally presses the armature away from the magnet poles, and in this position its free upper end engages behind the collar or flange 72 of the plunger 68, as shown in Fig. 3, so as to lock the plunger in its fully protracted position with respect to the movable strike member. When the electromagnet G is energized by closing the circuit, the armature is pulled back against the magnet poles, and the plunger 68 is thus released for repression by the controller 59, as hereinafter described.

The normal position of the parts when the door is closed is shown in Fig. 2. As the door closes, the controller makes contact with the strike in such a manner as to release the latch bolt and permit the latter to shoot out into the strike in the usual manner, as previously described. The controller bolt, however, cannot shoot out to its fully protracted position in the strike opening 54, because it is blocked by the plunger 68, which is ordinarily held in its fully protracted position by the armature 73 of the electromagnet G. With the controller bolt partially pushed into the lock case by the plunger 68, the dogging lever 55 is held in the "off" position by the plunger 61 on the controller bolt shank so that the latch bolt can be retracted by a key inserted in the cylinder lock from the outside or by the knob 22 on the inside. As the latch is retracted to open the door, the end of the groove 66 in the latch bolt head makes contact with the pin 65 on the controller bolt head at such a time that the controller bolt will be retracted substantially simultaneously with the latch bolt so that the strike will be fully cleared by the controller bolt as well as the latch bolt to permit the opening of the door.

The room occupant can lock the door by merely closing the same, the outer knob being permanently dogged against rotation, and access from the outside being confined to the keys. If valuable goods are stored in the room, and the occupant on leaving it wishes to have the door locked against the maid's key and duplicate guest keys, the hotel clerk, will, on request, actuate the electrical shut-out mechanism from the office by energizing the electromagnet G. As the magnet is energized, and the armature 73 is attracted by the magnet poles, the plunger 68 is released by the armature and the heavy spring 64 of the controller bolt immediately pushes said bolt outward to the full extent, overcoming the weak spring on the plunger, so that the spring 58 will then be caused to shift the lever 55 into dogging position. The keys adapted to the cylinder lock will then be inoperative to open the door, because they are ineffective to shift the dogging lever out of the path of the latch bolt. However, access to the room can still be had by means of the emergency key. On inserting the emergency key 40 into the keyhole 45 and turning it in a proper direction in the auxiliary lock E, the strike member F will be shifted in the manner previously described, so as to clear the latch bolt and controller bolt and permit the door to be immediately opened by pushing or pulling on the same. Supposing that the shut-out device is "on," as shown in Fig. 5, the withdrawal of the strike member F will permit the plunger 68 to shoot out again to its fully protracted position, as shown in Fig. 6, wherein it is locked by the armature 73 which is pressed outward by the spring 75. When the door has been opened and pressure on the emergency key is released, the movable strike member F will shift back to the normal position, shown in Fig. 3, under the influence of the spring 49 acting on bolt 37 of the emergency lock, and then when the door is closed again, it will lock automatically in the manner previously described.

It will be understood, therefore, that the shut-out device and the emergency release mechanism may be actuated in a very easy and convenient manner. It will be understood, furthermore, that by providing the described shut-out device and emergency release mechanism on the door frame, the tumbler mechanism of the cylinder lock may be of the simplest form owing to the relatively small number of keys used in connection with said lock.

I do not limit myself to a lock construction in which the bolt of the lock on the door is a latch bolt rather than a dead bolt, nor to the particular mechanism for dogging the lock bolt, nor to the particular mechanism for controlling the dogging device from the door frame by an electromagnet or the like, as various changes in the details of these features may be adopted without departing from the scope of the invention as defined in the claims.

I do not claim broadly herein the combination with a door and door frame, of a lock on the door having a case and a bolt therein, a key to retract said bolt, means including an auxiliary bolt for dogging said first bolt against retraction by said key, and a controlling member for said dogging mechanism located on the door frame and adapted to coöperate with said auxiliary bolt, as claimed in my application Serial No. 2912.

What I claim is:—

1. The combination with a door and door frame, of a bolt on the door for locking the latter to said frame, and an electrical shut-out device on the door frame coöperating with said bolt to lock the door; substantially as described.

2. The combination with a door and door frame, of a lock on the door having a bolt, a strike on the door frame to receive said bolt and an electromagnetic shut-out device on the door frame coöperating with said bolt to lock the door; substantially as described.

3. The combination with a door and door frame, of a lock on the door, a key-actuated emergency lock on the door frame, and an electromagnetic shut-out device for said first lock associated with said second lock; substantially as described.

4. The combination with a door and door frame, of a lock on the door, emergency release mechanism for said lock mounted on the door frame, and an electromagnetic shut-out device for said lock mounted on the door frame; substantially as described.

5. The combination with a door and door frame, of a lock on the door for securing the latter to said frame, a key for releasing said lock, an electromagnetic shut-out device on the door frame, and an emergency release mechanism for said lock on the door frame; substantially as described.

6. The combination with a door and door frame, of a lock on the door for securing the latter to said frame, a key for said lock, an emergency release mechanism for said lock mounted on the door frame, and an electromagnetic shut-out device which will prevent release of said door by said key but not by said emergency release mechanism; substantially as described.

7. In a lock, a bolt, a key for actuating said bolt, an emergency release mechanism for said lock, and an electromagnetic shut-out device which prevents the release of the door by said key but not by said emergency release mechanism; substantially as described.

8. In a lock, the combination of a bolt, a key for operating said bolt, an electrical shut-out device for preventing the operation of said bolt by said key, a second key, and means operative by said second key for releasing the door when said shut-out device has been actuated; substantially as described.

9. The combination with a door and door frame, of a lock on the door having a bolt, a movable key controlled strike member on the door frame coöperating with said bolt, and an electromagnetic shut-out device mounted on said strike member; substantially as described.

10. An emergency attachment for locks, comprising a movable strike member, means for moving the same, and an electromagnetic shut-out device mounted on said strike member; substantially as described.

11. An emergency attachment for locks, comprising a movable strike member, means for moving the same, a plunger carried by said strike member, and electromagnetic means for controlling the plunger; substantially as described.

12. In a lock, a bolt, a key for operating said bolt from the outside of the room, means for operating said bolt from the inside of the room, and an electromagnetic shut-out device for preventing the operation of said bolt by said key, while permitting the operation of said bolt by said inside operating means; substantially as described.

13. In a lock, the combination of a bolt, a key for operating the same from the outside of the room, a knob for operating said bolt from the inside of the room, and an electromagnetic shut-out device mounted on the door frame for preventing the operation of said bolt by said key without interfering with the operation thereof by said knob; substantially as described.

14. In a lock, a latch bolt, pin tumbler mechanism for retracting the same from the outside of the door, a knob for retracting said bolt from the inside of the door, and an electromagnetic shut-out device on the door frame for preventing the retraction of said bolt by said pin tumbler mechanism without interfering with the retraction of the bolt by said knob; substantially as described.

15. The combination with a door and door frame, of a lock on the door having a bolt, a key for actuating said bolt, means in said lock for dogging said bolt in its protracted position so that the key cannot retract the same, and electromagnetic means on the door frame for controlling said dogging means; substantially as described.

16. The combination with a door and door frame, of a lock on the door having a bolt a key for actuating said bolt, means in said lock for dogging said bolt against retraction by said key, a projecting controller bolt for controlling said dogging means, and an electromagnetically operated device coöperating with said controller bolt; substantially as described.

17. In a lock, a bolt on the door, a change key for operating said bolt, an electromagnetic shut-out device, and an emergency release mechanism on the door frame for opening the door when said shut-out device has been actuated; substantially as described.

18. In a lock, a bolt, means normally dogging said bolt, and means for releasing said dogging means during the closing movement of the door, and after the door has finally closed; substantially as described.

19. In a lock, the combination of a bolt, means for dogging said bolt when the door is open, means for releasing said bolt during the closing of the door, and after the door has closed, and means for re-dogging the bolt; substantially as described.

20. In a lock, a latch bolt, means for dogging the same while the door is open, means for releasing the bolt during the closing movement of the door, and after the door has closed, and electrically controlled means for re-dogging the bolt; substantially as described.

21. In a lock, a latch bolt, a key for retracting said bolt from the outside of the door, means for dogging said bolt against retraction by said key when the door is open, means for releasing the bolt while the door is being closed, and after it has been closed, so that the door can be opened by the key, and electrically controlled means for re-dogging the bolt so that the door cannot be opened by said key; substantially as described.

22. In a lock, a bolt, a device tending to dog the bolt against retraction, a key for retracting the bolt when released from said dogging device, means for shifting said dogging device to releasing position when the door is closed, and means for rendering said last-named means inoperative; substantially as described.

23. In a lock, a latch bolt, means normally dogging the same, means for releasing the dogging means, when the door is closed, and electrically controlled means for rendering said releasing means inoperative; substantially as described.

24. In a lock, a latch bolt, a key for retracting the same, a device tending to dog said bolt against retraction by said key, a controller for said last-named means, and an electrically operated device coöperating with said controller; substantially as described.

25. In a lock, a bolt, a strike member on the door frame coöperating therewith, a key for retracting said bolt from the outside of the door, a device for dogging said bolt against retraction by said key, a controller for said dogging device, and an electromagnetically controlled member mounted on the strike member to coöperate with said controller; substantially as described.

26. The combination with a door and door frame, of a lock on the door having a bolt, a strike member on the frame coöperating with said bolt, a key for operating said bolt, a device for dogging the bolt against retraction by said key, and means including an electromagnet on the door frame for controlling the operation of said dogging means; substantially as described.

27. The combination with a door and door frame, of a lock on the door, a key to operate said lock, an electromagnetically controlled device for preventing the operation of said lock by said key, and emergency release means for releasing the door when said preventing means is operative; substantially as described.

28. The combination with a door and door frame, of a lock on the door, a key to operate said lock, and an electromagnetically controlled shut-out device on the door frame for preventing the operation of said lock by said key; substantially as described.

29. The combination with a door and door frame, of a lock on the door, a key for operating said lock, an electromagnetically controlled shut-out device for said lock, and emergency release mechanism mounted on the door frame; substantially as described.

30. The combination with a door and door frame, of a lock on the door having a bolt, a key to operate said bolt, a strike on the door frame to receive said bolt, and an electromagnetically controlled shut-out device for preventing the withdrawal of said bolt from said strike by said key; substantially as described.

31. The combination with a door and door frame, of a bolt on the door for locking said door to said frame, a key for actuating said bolt from the outside of the door, a knob for actuating said bolt from the inside of the door, and an electromagnetically controlled shut-out device which prevents the retraction of said bolt by said key but not by said knob; substantially as described.

32. The combination with a door and door frame, of a bolt on the door for locking the door to the frame, a key for retracting said bolt from the outside of the door, a knob for retracting said bolt from the inside of the door, an electromagnetically controlled shut-out device which prevents the retraction of said bolt by said key but not by said knob, an emergency release mechanism for said lock which will release the door when said shut-out device has been operated, and a key to operate said emergency release mechanism; substantially as described.

33. The combination with a door lock and a key therefor, of an electromagnetically controlled shut-out device for preventing the operation of said lock by said key.

34. The combination with a door and door frame, of a lock on the door having a bolt, a keeper on the door frame to receive said bolt, a key for operating said bolt, and an electrically controlled shut-out device on the door frame coöperating with said lock to prevent the withdrawal of said bolt by said key when it has been protracted.

35. The combination with a lock and a key therefor, of distance controlled means for preventing the operation of said lock by said key.

In witness whereof, I have hereunto set my hand on the 8th day of Dec., 1915.

HENRY G. VOIGHT.